(12) United States Patent
Presler-Marshall

(10) Patent No.: US 12,147,337 B2
(45) Date of Patent: Nov. 19, 2024

(54) MEMORY USAGE MONITORING AND IMPROVEMENT IN A GARBAGE-COLLECTED PROGRAMMING ENVIRONMENT

(71) Applicant: Salesforce, Inc., San Francisco, CA (US)

(72) Inventor: Martin Presler-Marshall, Raleigh, NC (US)

(73) Assignee: Salesforce, Inc., San Francisco, CA (US)

( * ) Notice: Subject to any disclaimer, the term of this patent is extended or adjusted under 35 U.S.C. 154(b) by 67 days.

(21) Appl. No.: 18/159,257

(22) Filed: Jan. 25, 2023

(65) Prior Publication Data
US 2024/0248841 A1 Jul. 25, 2024

(51) Int. Cl.
*G06F 12/02* (2006.01)
(52) U.S. Cl.
CPC .. *G06F 12/0253* (2013.01); *G06F 2212/1016* (2013.01)
(58) Field of Classification Search
CPC ............. G06F 12/0253; G06F 2212/1016
See application file for complete search history.

(56) References Cited

U.S. PATENT DOCUMENTS

| | | |
|---|---|---|
| 2020/0042573 A1 | 2/2020 | Presler-Marshall |
| 2022/0300574 A1 | 9/2022 | Presler-Marshall |

OTHER PUBLICATIONS

DZone, Java Thread: retained memory analysis, Jan. 2023, Available at: https://dzone.com/articles/java-thread-retained-memory (Year: 2023).*
Google, Memory Terminology, May 2015, Available at: https://developer.chrome.com/docs/devtools/memory-problems/get-started (Year: 2015).*
Firefox, Dominators, Jan. 2023, Available at: https://firefox-source-docs.mozilla.org/performance/memory/dominators.html (Year: 2023).*

* cited by examiner

*Primary Examiner* — Ryan Bertram
(74) *Attorney, Agent, or Firm* — Polygon IP, LLP

(57) ABSTRACT

Garbage collection roots for an application may be identified based on a garbage collector implemented in a programming environment. A garbage collection root may correspond with an object and a class definition. Retained memory values may be determined for the garbage collection roots via a graph dominator. A retained memory value may indicate an amount of memory employed by a garbage collection root. Application classes and associated class memory values may be determined. An application class may include one or more of the garbage collection roots associated with object class definitions positioned within a portion of a class definition hierarchy corresponding with the respective application class. A class memory value may aggregate the retained memory values for garbage collection roots included within an application class. A source of a change in memory usage between application versions may be identified based on the application classes and class memory values.

20 Claims, 7 Drawing Sheets

MEMORY USAGE MONITORING AND IMPROVEMENT IN A GARBAGE-COLLECTED PROGRAMMING ENVIRONMENT

FIELD OF TECHNOLOGY

This patent document relates generally to programming environments and more specifically to memory management.

BACKGROUND

Many modern programming languages, such as Java, Javascript, Python, and others, rely on automatic garbage collection to simplify memory allocation. With automatic garbage collection, the programmer allocates memory when needed but doesn't need to track when the memory can be freed. Instead, the runtime environment's storage manager frees memory automatically. Garbage collection has dramatically improved developer productivity and eliminated an entire class of programming errors.

However, garbage collection has not eliminated all types of memory-related problems. Memory is still a limited resource, and consuming too much of it can still cause performance or availability problems. Each time garbage collection runs, it consumes CPU power and (typically) adds latency to any requests being processed by the service, or causes a delay for a user interacting with it. This is a problem for monolithic applications where many, many teams contribute to a codebase that must all run under a single total memory usage constraint. In such contexts, even a moderate increase in memory usage by multiple teams can add up to a significant problem. Memory usage is also a problem for microservices, where the general design pattern is to scale the service by creating more instances of that service. The more memory each instance consumes, the more expensive it is to scale up that service. Accordingly, improved techniques for tracking how much memory is being used within a given application and identifying when this usage pattern changes are desired.

BRIEF DESCRIPTION OF THE DRAWINGS

The included drawings are for illustrative purposes and serve only to provide examples of possible structures and operations for the disclosed inventive systems, apparatus, methods and computer program products for tracking memory usage in a garbage-collected programming environment. These drawings in no way limit any changes in form and detail that may be made by one skilled in the art without departing from the spirit and scope of the disclosed implementations.

DETAILED DESCRIPTION

Figure 1:
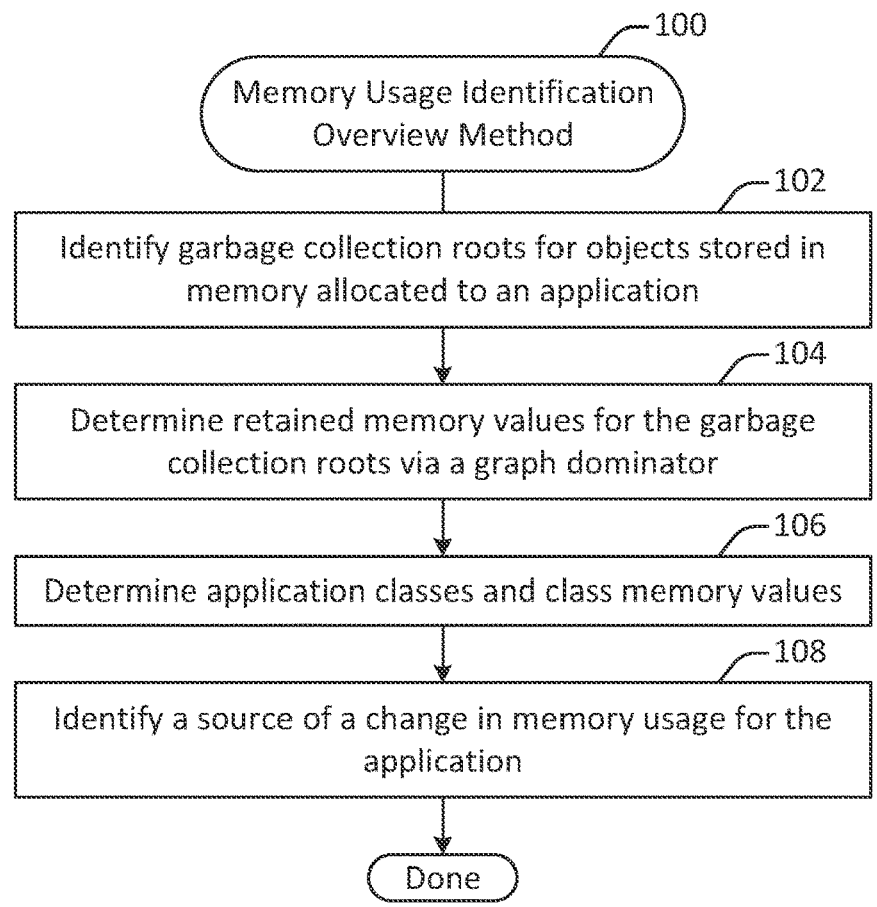
FIG. 1 illustrates a memory usage identification overview method, performed in accordance with one or more embodiments.

Techniques and mechanisms described herein provide for improved tracking of memory usage. Memory allocation data may be reduced to a reasonable size. In addition, memory allocation may be tracked over time, while at the same time avoiding double-counting of objects. Then, memory usage may be automatically tracked over time. First, retained memory for GC roots in a memory dump may be computed. Then, package names are employed to aggregate memory usage into a package hierarchy.

Techniques and mechanisms described herein provide for improved tracking of objects in use within a programming environment. In many programming environments, an application is allocated a designated maximum amount of memory. The application uses this memory as objects are created and assigned to portions of this memory. To avoid burdening programmers, many programming environments do not impose a requirement to explicitly free memory associated with objects that are no longer in use. Instead, when the memory used by the application approaches the maximum, a garbage collection process reclaims memory from objects that are no longer in use. Garbage collection techniques typically involve distinguishing objects in memory that are still in use from those that are no longer in use and hence collectable. Then, memory associated with the objects no longer in use may be freed for use by newly created objects. Such techniques rely on a correctness guarantee, ensuring that memory associated with live objects (i.e., objects that remain in use) will not be freed by garbage collection.

In a complex program, memory usage is a complex consequence of potentially many different objects, libraries, instructions, and dependencies, as well as being dependent on runtime conditions. For instance, memory usage for a program may depend on situational conditions such as user input and data being processed, which may vary from instance to instance of the program. The referential nature of objects gives rise to complexity that makes memory usage particularly difficult to track.

Consider the challenge of tracking the amount of memory used by an object or objects in an instance of a program. The term "shallow memory usage" refers to the size of a given object or block of memory. In Java code, for instance, text values are represented by String objects. Every String object is the same size (for example, 32 bytes in some implementations), as it contains just some basic information about the text (length, cached hash code, and so on). The array of bytes that stores the text is stored in a separate object-a character array-the size of which depends on the amount of text the String object contains. Thus, shallow memory usage is insufficient for tracking total memory usage. A deeper concept is "retained memory usage", which refers to the objects or other memory allocations that are kept live by a given object. Using the String example, the retained heap size of different Strings will vary because the retained memory usage for a string object includes not just the String object but also the underlying character array. However, many objects are far more complex than String objects, for instance including references to other objects. These relationships give rise to complex graphs of references, often including cyclic references. To account for such complexities, a graph dominator algorithm may be used to compute the retained memory of an object based on the sum of the shallow memory usage for all objects dominated by that object.

According to various embodiments, graph dominance refers to relationships reflected in a directed graph. A node d dominates a node n if every path from the entry node to node n must go through node d. By definition, every node dominates itself. The immediate dominator of a node n is the unique node that strictly dominates n but does not strictly dominate any other node that strictly dominates n. A dominator tree is a tree where each node's children are those nodes it immediately dominates. A graph dominator algorithm is a process for determining one or more dominance relationships and potentially a dominator tree for a directed graph.

Garbage collection is a resource-intensive process. When a system is engaged in garbage collection, the resources involved in that process cannot be used to serve client requests or perform other important functions. The frequency with which garbage collection needs to be run may be affected by the total memory allocated to an application, by the allocation rate of objects within the application, and by the amount of memory consumed by live objects within the application. Techniques and mechanisms described herein provide for improved and automated tracking of memory consumption by live objects within an application.

Conventional memory management techniques, while suitable for garbage collection in a running program, are poorly suited for investigating the source of an increase in memory, and are poorly suited for automation. For example, when using conventional techniques, an administrator may open a memory dump of a program in a graphical tool and ask the tool to compute graph dominators for objects in the memory dump. The administrator may then view the "GC roots", which are objects known by the runtime to be live, in order of their retained size. For instance, references to objects in any stack frame of a running thread are live and thus are GC roots. Then, the administrator may manually investigate large objects to see if they have increased in size compared to a baseline dump. This approach is ineffective for many reasons, for instance because there may be a large number of objects of a given class.

As another example, when using conventional techniques, a user may ask a graphical tool to compute the retained size for all objects of a given class. The user may then compare this retained size this to a baseline memory dump to see if that class has increased in memory usage. However, because objects may reference each other, not all objects of a given class are necessarily GC roots. Hence, some of the memory retained by instances of a class A may also be retained by instances of class B, leading to double counting the retained memory. This double counting may cause confusion as to the attribution of the memory increase.

The challenges associated with investigating memory usage using conventional techniques are multiplied when attempting to automate such investigations. For example, even a microservice may include hundreds or thousands of distinct classes, while a monolithic application may have 100,000 or more distinct classes. Tracking usage over time across such a large number of distinct classes with conventional techniques is impractical. In contrast, embodiments described herein provide for memory tracking that scales to arbitrary numbers of objects and classes.

As another example, changes in reference patterns can change graph dominator calculations. Such changes may result in memory consumption being effectively "moved" from Class A to Class B even when actual memory consumption remains constant. Conventional techniques that aggregate memory usage by class will be misled by such a change. In contrast, techniques and mechanisms described herein provide for accurate attribution of memory even in the event of renaming classes.

As yet another example, a new class may be introduced to perform functions previously performed by a different class. When using conventional techniques, the analyst may be misled into believing that memory usage has increased. In contrast, techniques and mechanisms described herein provide for aggregation of memory usage based on class hierarchy, allowing for such changes to be accurately represented in the overall memory usage.

As still another example, as discussed above, examining one class at a time often ends up double-counting memory usage by assigning memory usage to multiple root classes, because a given class is not necessarily a GC root. In contrast, techniques and mechanisms described herein may be used to accurately identify memory usage by unifying the analysis across different classes at the same time.

As still another example, conventional techniques typically involve manual analysis of the largest elements in a memory heap, and tend to miss more subtle memory issues such as the introduction of many new GC roots, an increase in the size of a small object with many copies, and the like. In contrast, techniques and mechanisms described herein provide for the automated identification of such issues.

Techniques and mechanisms described herein provide for tracking and improving memory usage in complex programming environments, thus improving the functioning of the computer itself. For instance, when using conventional techniques, identifying increases in memory usage is an inherently manual and ineffective process. In contrast, when using techniques and mechanisms described herein, increases in memory consumption can be automatically identified for correction. In some embodiments, the automated nature of the memory tracking techniques may facilitate memory tracking across more samples and more types of usage. Then, memory usage can be tracked and plotted over time. In particular embodiments, automation systems can automatically generate a bug report when an excessive memory increase is detected.

According to various embodiments, techniques and mechanisms described herein are applicable to a broad range of computing systems. For example, techniques and mechanisms described herein may be applied in computing systems of various sizes, from large-scale monolithic applications with objects in memory from potentially hundreds of thousands of different classes to small-scale micro-services with comparatively few in-memory objects from comparatively fewer classes. As another example, techniques and mechanisms described herein may be integrated into software development tools such as the Eclipse Memory Analyzer.

FIG. 1 illustrates a memory usage identification overview method 100, performed in accordance with one or more embodiments. In some embodiments, the method 100 may be performed on any suitable computing device. For instance, the method 100 may be performed on a computing device configured to perform memory analysis for a computing environment.

One or more garbage collection roots are identified at 102 for objects stored in memory allocated to an application. In some embodiments, the one or more garbage collection roots may be identified based on information produced by a garbage collector implemented at a programming environment. The memory may be allocated within the programming environment. A garbage collector root may correspond with an object stored in that allocated memory. The object may have a respective object class definition within a class definition hierarchy. For instance, in the Java programming language, the class java.util.ArrayList may be a class located hierarchically under the java.util class.

Retained memory values for the garbage collection roots are determined via a graph dominator at 104. In some embodiments, retained memory values may be returned by the garbage collector. Retained memory values may be determined by applying a graph dominator algorithm to the garbage collection roots as sources. The graph dominator algorithm may then traverse references made by those roots until all references have been followed, ultimately traversing the entire graph in which the garbage collection roots are situated. A retained memory value for a garbage collection root may be determined by summing the shallow memory usage for the garbage collection root, but also the memory usage of objects dominated by the garbage collection root. Because each live object has just one garbage collection root object that dominates it, memory usage is not double counted.

Application classes and class memory values are determined based on the garbage collection roots and retained memory values at 106. An application class may include one or more of the garbage collection roots associated with object class definitions positioned within a portion of the class definition hierarchy corresponding with the application class of those garbage collection roots. A class memory value may aggregate the retained memory values corresponding with the one or more garbage collection roots included within the associated application class.

A source of a change in memory usage is identified for the application at 108. In some embodiments, the change in memory usage may be identified by determining a difference in memory usage between different versions of the application based on the application classes and associated class memory values. Identifying the change in memory usage may involve, for instance, automatically generated a bug report, transmitting a message to a systems administrator, or performing other such actions. The change in memory usage may identify the source of the change which may be, for instance, a class or classes within the class hierarchy.

Figure 2:
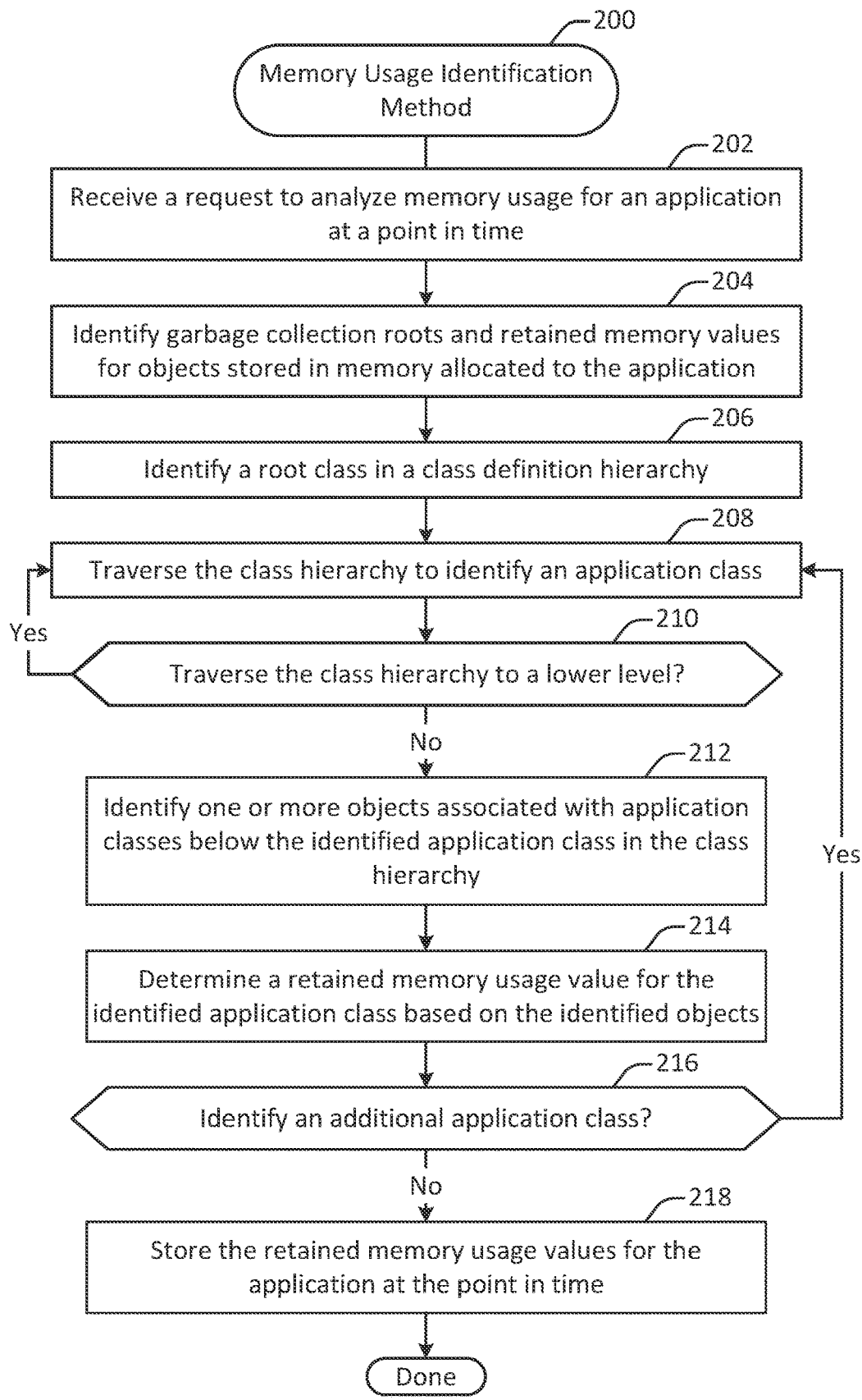
FIG. 2 illustrates a method for identifying memory usage, performed in accordance with one or more embodiments.

FIG. 2 illustrates a method 200 for identifying memory usage, performed in accordance with one or more embodiments. In some embodiments, the method 200 may be performed on any suitable computing device. For instance, the method 200 may be performed on a computing device configured to perform memory analysis for a computing environment.

A request to analyze memory usage for an application at a point in time is received at 202. In some embodiments, the request may identify a memory dump for the application at the point in time. The memory dump may identify information such as objects stored in memory, object class definitions associated with the objects, and memory usage associated with the objects.

Garbage collection roots and retained memory values for objects stored in memory allocated to the application are identified at 204. In some embodiments, the garbage collection roots and retained memory values may be identified based on information returned by a garbage collector. The garbage collector may identify the garbage collection roots by determining, for instance, which objects are directly referenced within an application context at the point in time. The garbage collector may then apply a graph dominance process to determine retained memory values for the garbage collection roots and/or for other objects within the memory dump.

A root class in a class definition hierarchy is identified at 206. In some embodiments, a root class may be the highest level class in a class definition hierarchy. For instance, in Java, object definitions such as Java.lang.math may ultimately descend from a root node "Java".

In some embodiments, multiple root classes may be identified. For instance, an environment may include packages from different languages. In such a configuration, each root class may be analyzed separately for the purposes of memory usage.

The class hierarchy is traversed to identify an application class at 208. In some implementations, any suitable hierarchical traversal may be employed. For example, a depth-first tree traversal may be used. The traversal may involve selecting nodes lower in the hierarchy until a terminating condition is met.

A determination is made at 210 as to whether to traverse the class hierarchy to a lower level. In some implementations, the determination may be made at least in part based on the depth in the hierarchy that the identified application class occupies. For instance, the hierarchy may be aggregated at a default depth level of three nodes deep from the root class.

In some embodiments, the same depth level may be used for all application classes. Alternatively, different application classes may be associated with different depth levels. For example, application classes that include relatively larger retained memory usage values may be aggregated at a greater depth level than those with relatively smaller retained memory usage values. As another example, application classes that include relatively fewer immediate descendants in the hierarchy may be aggregated at a greater depth level than those with relatively many immediate descendants in the hierarchy. As yet another example, a user may identify particular depth levels for analyzing particular application class groups.

According to various embodiments, the depth level to which to aggregate memory usage may be strategically determined based on any of a variety of factors. For example, aggregating memory usage to a lower depth level in the application class hierarchy may provide greater granularity at the cost of increasing the number of class groups for which memory values are returned. As another example, different programming environments, different programming languages, and/or different applications may benefit from higher or lower levels of granularity in memory usage aggregation.

If it is determined not to traverse the class hierarchy to a lower level, then one or more objects associated with application classes below the identified application class in the class hierarchy are identified at 212. In some embodiments, the one or more objects may be identified based at least in part on class definition name. For instance, in the Java programming language, a class grouping of Java.Class.Subclass would include any objects associated with class definitions that start with that class grouping, such as Java-.Class.Subclass.CL1, Java.Class.Subclass.CL2, and the like. Such objects may be identified based on the memory dump associated with the request received at 202.

A retained memory usage value for the identified application class is determined at 214 based on the identified objects. In some embodiments, the retained memory usage value for the identified application class may be determined based on summing the individual retained memory usage values for the objects identified at 212. Such values may be returned by the garbage collector and identified as discussed with respect to the operation 204.

A determination is made at 216 as to whether to identify an additional application class. In some embodiments, additional application classes may be identified until all application classes have been either identified at operation 208 or included within a group based on the class hierarchy at 212.

If it is determined to identify an additional application class, then the class hierarchy is traversed again at 208 to identify a new application class. If instead it is determined not to identify an additional application class, then at 218 the retained memory usage values are stored. In some embodiments, storing the retained memory usage values may involve identifying the class groupings, the retained memory usage value associated with the class groupings, the application, the point in time, and/or any other relevant information.

Figure 3:
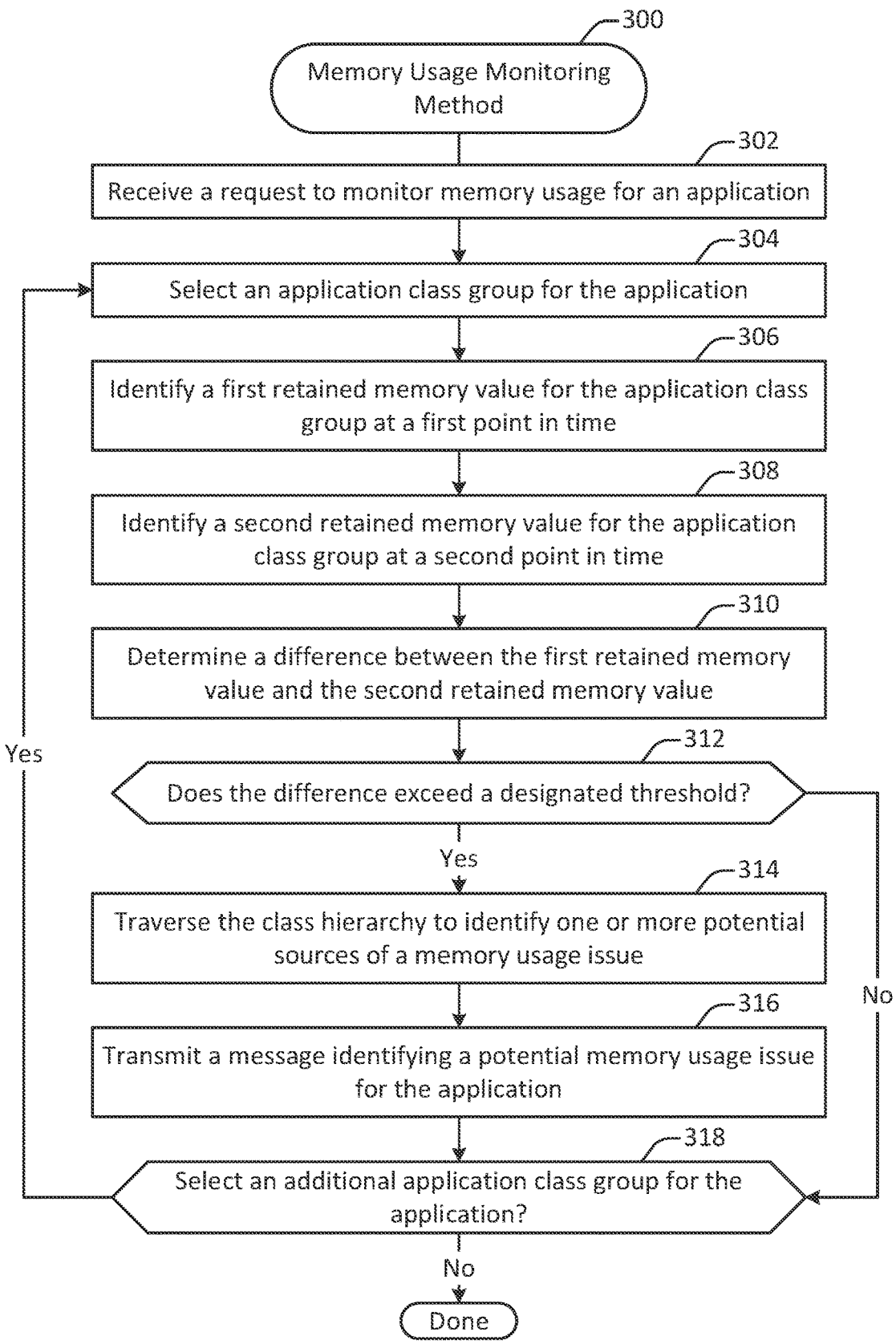
FIG. 3 illustrates a memory usage monitoring method, performed in accordance with one or more embodiments.

FIG. 3 illustrates a memory usage monitoring method 300, performed in accordance with one or more embodiments. In some embodiments, the method 300 may be performed on any suitable computing device. For instance, the method 300 may be performed on a computing device configured to perform memory analysis for a computing environment.

According to various embodiments, the method 300 may be used to compare memory usage for an application between two points in time. For example, two points in time may correspond to successive builds for an application. As another example, the first point in time may correspond to a baseline build, while the second point in time may correspond to a later build.

In some embodiments, the method 300 may be performed as part of one or more functional unit tests. For instance, different builds of an application may be tested using a standard set of inputs. The memory usage may then be compared under standardized conditions.

A request is received at 302 to monitor memory usage for an application. In some embodiments, the request may be generated based on user input. For instance, a user may manually request to analyze memory usage. Alternatively, the request may be generated automatically. For instance, the system may analyze memory usage for an application at scheduled times, or when a triggering condition such as a new build for the application is detected.

An application class group for the application is selected at 304. In some embodiments, the application class groups may be identified as discussed with respect to the method 200 shown in FIG. 2. The application class groups may then be selected for analysis in parallel or in sequence, and in any suitable order.

A first retained memory value for the application class group at a first point in time is identified at 306. A second retained memory value for the application class group at a second point in time is identified at 308. According to various embodiments, the retained memory values for the application class group may be identified as discussed with respect to the method 200 shown in FIG. 2. The retained memory values may correspond to different points in time, such as different builds for the application.

A difference between the first retained memory value and the second retained memory value is determined at 310. In some embodiments, the difference may be computed as a difference in overall memory usage for the application class group. Alternatively, or additionally, a different type of difference value may be determined. For instance, a determination may be made as to a change in the number of object instances between the first and second point in time.

A determination is made at 312 as to whether the difference exceeds a designated threshold. In some implementations, the designated threshold may be a fixed value, such as an amount of memory that is determined based on characteristics of the application, the computing environment, and other such factors. Alternatively, the designated threshold may be a percent, such that a large percent increase in memory usage gives rise to a memory usage issue warning.

If the difference does exceed the designated threshold, then at 314 the class hierarchy is traversed to identify one or more potential sources of a memory usage issue. For instance, the system may drill down into the class hierarchy and compare a retained memory usage value for a subtree at the first point in time to a retained memory usage value for the same subtree at the second point in time. By performing this operation for different subtrees of the application class group selected at 304, the subclass or subclasses for which memory usage increased may be identified and provided to the software developer.

At 314 a message identifying a potential memory usage issue for the application is transmitted. In some embodiments, the message may involve generating a bug report within a bug tracking system. Alternatively, or additionally, one or more email messages or other correspondence messages may be sent to users, for instance via email. The message may include information selected from the class hierarchy tree and/or the graph dominator tree.

A determination is made at 318 as to whether to select an additional application class group for the application. In some embodiments, additional application class groups may be selected until all application class groups for the application have been analyzed.

Figure 4A:
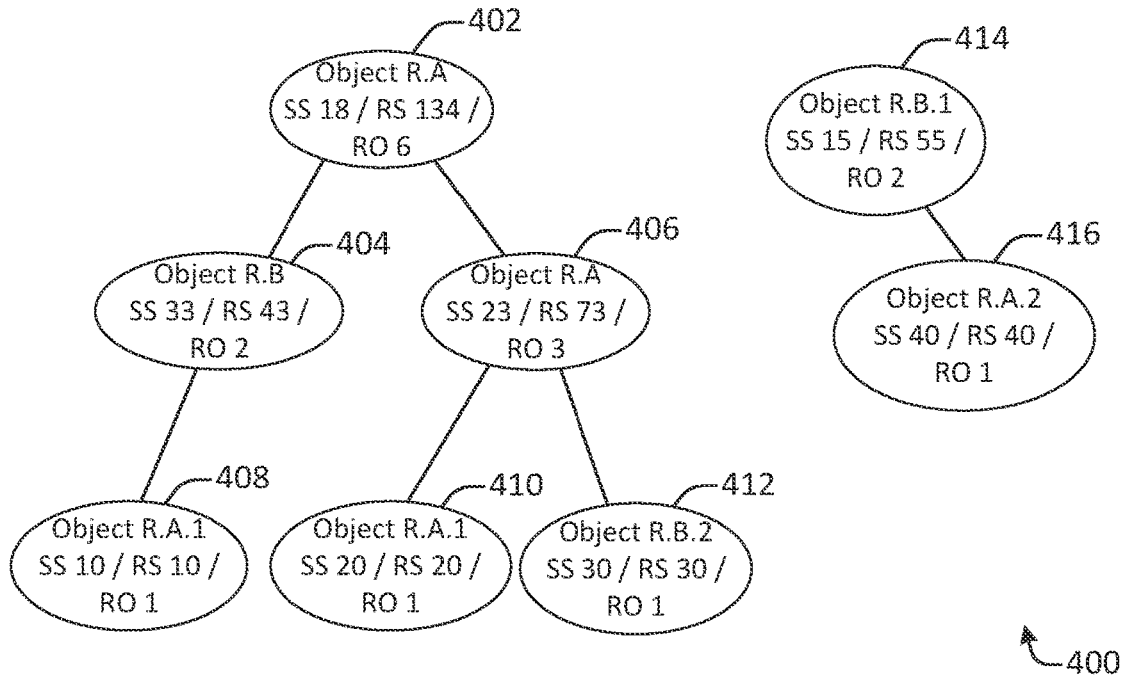
FIG. 4A illustrates a diagram of a graph dominator tree generated in accordance with one or more embodiments.
Figure 4B:
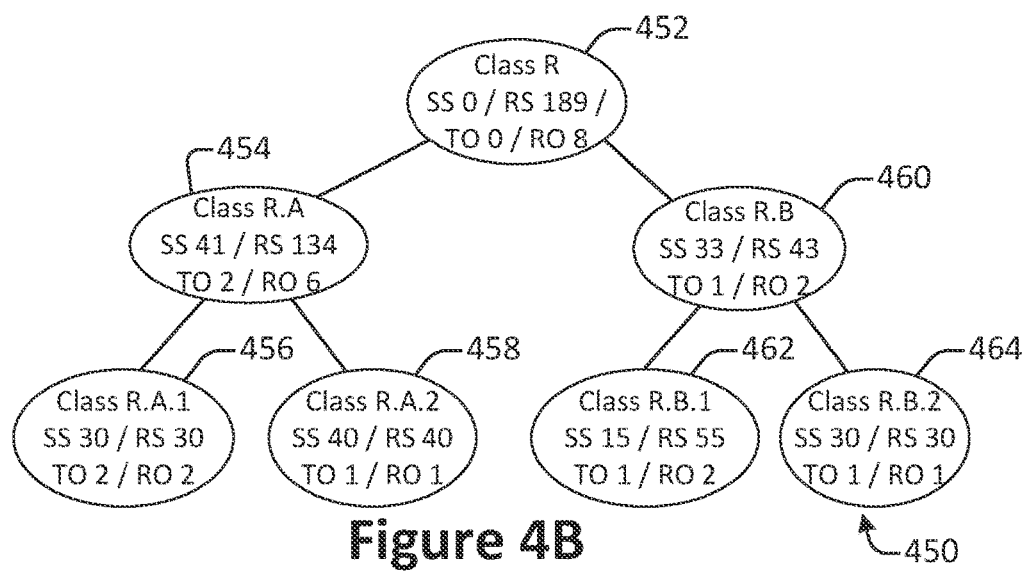
FIG. 4B illustrates a diagram of a class hierarchy generated in accordance with one or more embodiments.

FIG. 4A illustrates a diagram of a graph dominator tree 400 generated in accordance with one or more embodiments. FIG. 4B illustrates a diagram 450 of a class hierarchy generated in accordance with one or more embodiments.

The graph dominator tree 400 may be determined based on information returned by a garbage collector. The graph dominator tree 400 shows a number of nodes that correspond to objects within a programming environment, along with their retained memory values.

It is important to note that a graph dominator tree for even a simple application may include many thousands of nodes, while a graph dominator tree for a complex application may potentially include many millions of nodes, or more. However, the graph dominator tree 400 includes only a few nodes, for the purpose of illustration.

The class hierarchy tree 450 may be constructed based at least in part on the graph dominator tree 400. Each object shown in the graph dominator tree 400 corresponds to a respective object class definition shown in the class hierarchy tree 450.

In FIG. 4A and FIG. 4B, the programming environment includes a root class R. The root class R includes two classes Class A and Class B. Class A and Class B each include two subclasses, Class A.1 and Class A.2, and Class B.1 and Class B.2. It is important to note that a programming environment for even a simple application may include many thousands of nodes, while a programming environment for a complex application may include hundreds of thousands, if not millions, of different classes. However, FIG. 4A and FIG. 4B include only a few classes, for the purpose of illustration.

The graph dominator tree includes two nodes, Object R.A 402 and Object R.B.1 414 that are GC roots. In some embodiments, an object may be identified as a GC root when it is directly referenced within a programming language context. For instance, Object R.A 402 and Object R.B.1 414 may be objects created within a function being executed.

In FIG. 4A, Object R.B.1 414 dominates the object R.A.2 414. The Object R.A 402 dominates the Object R.B 404, which in turn dominates the Object R.A.1 408. The Object R.A 402 also dominates the Object R.A 406, which in turn dominates the Object R.A.1 410 and the Object R.B.2 412.

In the example shown in FIG. 4A, each node in the graph dominator tree includes values for the shallow size in memory (SS) of the object, the retained size in memory (RS) for the object, and the number of retained objects (RO). In practice, retained memory values may be measured in kilobytes, megabytes, or any other suitable unit. In FIG. 4A and FIG. 4B, however, simple integer values are used for the purpose of illustration.

For example, the object R.A.1 408 has a shallow size of 10. Because it is a leaf node that does not dominate any other objects, its retained size is also 10 and it includes 1 retained object (i.e., it retains itself). As another example, the object R.B 404 has a shallow size of 33. Because it dominates the object R.A.1 408, its retained size is 43, which includes both its shallow size and the retained size of its immediately dominated children. Similarly, it retains two objects, itself and the object R.A.1 408. As yet another example, the object R.A 402 includes a shallow size of 18 and a retained size of 134, which is obtained by summing the shallow size of the object R.A. 402 (i.e., 18) with the retained sizes of its immediately dominated children object R.B. 404 (i.e., 43) and object R.A 406 (i.e., 73). It retains 6 objects, which include itself and the 5 objects dominated by it (i.e., nodes 404-412).

The class hierarchy tree 450 shows the shallow size in memory values (SS), the retained size in memory values (RS), the total object counts (TO) and the retained object counts (RO) at different levels of the class hierarchy. For example, there are two objects of class R.A.1 456 (i.e., the object R.A.1 408 and the object R.A.1 410), neither of which dominates any other object. Hence, both the shallow size and the retained size for the class R.A.1 456 is 30, and both the total and retained object counts is 2. As another example, the class R.A 454 has a shallow size of 41, obtained by summing the shallow size of the object R.A. 406 (i.e., 23) and the shallow size of the object R.A. 402 (i.e., 18). The retained size of the class R.A 454 is 134 because the object R.A. 402 dominates the object R.A. 406, and hence the retained size of the object R.A. 402 encompasses the object R.A. 406. There are two objects of the class R.A. 454 (i.e., the object R.A. 402 and the object R.A. 406) and hence the total object count is 2. The object R.A. 402 dominates the object R.A. 406 and includes 6 total objects, so the retained object count of the class R.A. 454 is 6. As yet another example, the class R 452 has 0 total objects and a shallow size of zero because no objects of type R exist. However, all objects in FIG. 4A fall within the class R 452, so the class R 452 retains 8 objects and has a total retained memory value of 189 (i.e., the retained memory value of 134 for the object R.A. 402 summed with the retained memory value of 55 for the object R.B.1 414).

Figure 5:
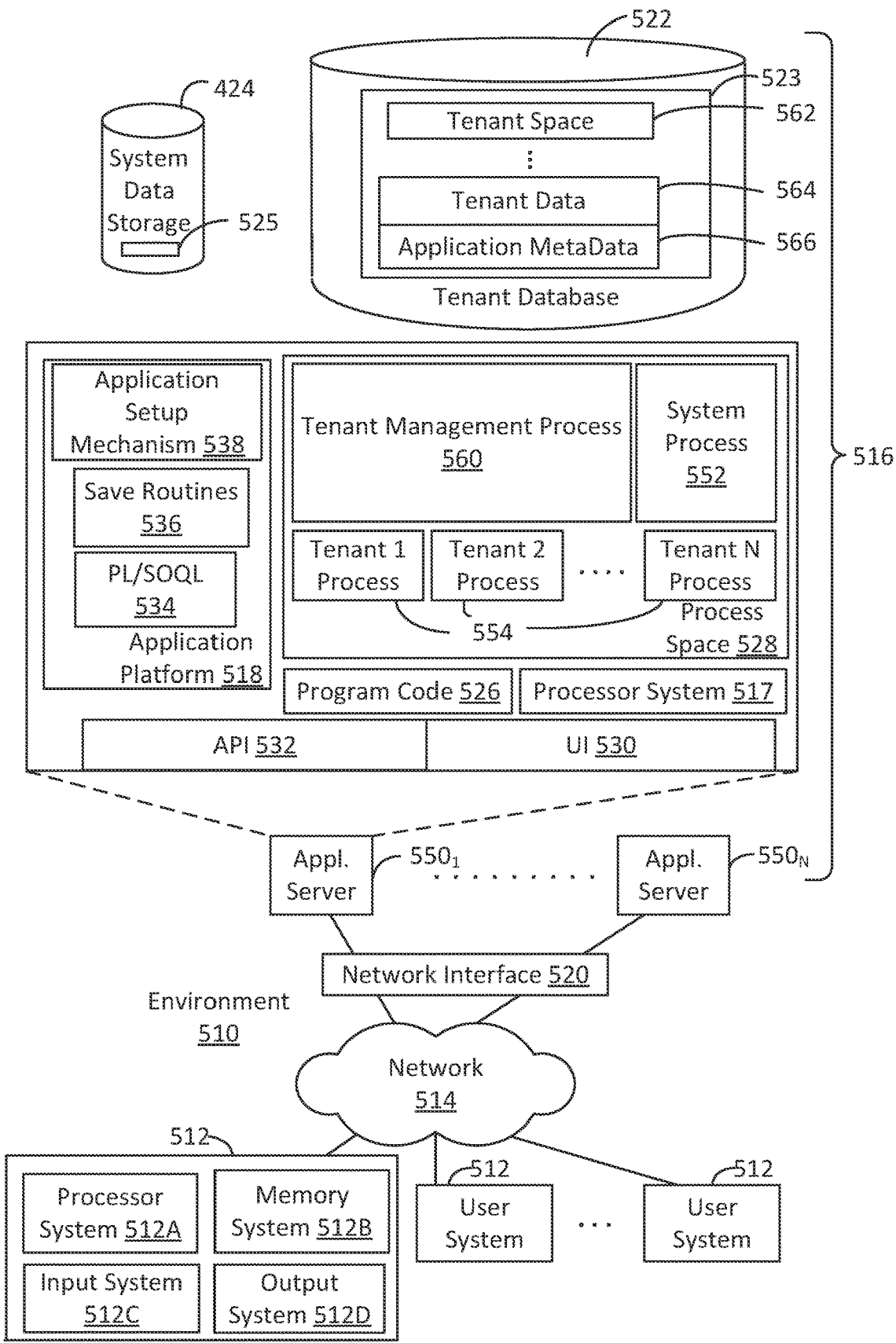
FIG. 5 shows a block diagram of an example of an environment that includes an on-demand database service configured in accordance with some implementations.

FIG. 5 shows a block diagram of an example of an environment 510 that includes an on-demand database service configured in accordance with some implementations. Environment 510 may include user systems 512, network 514, database system 516, processor system 517, application platform 518, network interface 520, tenant data storage 522, tenant data 523, system data storage 524, system data 525, program code 526, process space 528, User Interface (UI) 530, Application Program Interface (API) 532, PL/SOQL 534, save routines 536, application setup mechanism 538, application servers 550-1 through 550-N, system process space 552, tenant process spaces 554, tenant management process space 560, tenant storage space 562, user storage 564, and application metadata 566. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 516, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 518 may be a framework that allows the creation, management, and execution of applications in system 516. Such applications may be developed by the database service provider or by users or third-party application developers accessing the service. Application platform 518 includes an application setup mechanism 538 that supports application developers' creation and management of applications, which may be saved as metadata into tenant data storage 522 by save routines 536 for execution by subscribers as one or more tenant process spaces 554 managed by tenant management process 560 for example. Invocations to such applications may be coded using PL/SOQL 534 that provides a programming language style interface extension to API 532. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 566 for a subscriber making such an invocation. Such system processes may also manage execution of application metadata 566 as an application in a virtual machine.

In some implementations, each application server 550 may handle requests for any user associated with any organization. A load balancing function (e.g., an F5 Big-IP load balancer) may distribute requests to the application servers 550 based on an algorithm such as least-connections, round robin, observed response time, etc. Each application server 550 may be configured to communicate with tenant data storage 522 and the tenant data 523 therein, and system data storage 524 and the system data 525 therein to serve requests of user systems 512. The tenant data 523 may be divided into individual tenant storage spaces 562, which can be either a physical arrangement and/or a logical arrangement of data. Within each tenant storage space 562, user storage 564 and application metadata 566 may be similarly allocated for each user. For example, a copy of a user's most recently used (MRU) items might be stored to user storage 564. Similarly, a copy of MRU items for an entire tenant organization may be stored to tenant storage space 562. A UI 530 provides a user interface and an API 532 provides an application programming interface to system 516 resident processes to users and/or developers at user systems 512.

System 516 may implement a web-based memory analysis system. For example, in some implementations, system 516 may include application servers configured to implement and execute memory analysis software applications. The application servers may be configured to provide related data, code, forms, web pages and other information to and from user systems 512. Additionally, the application servers may be configured to store information to, and retrieve information from a database system. Such information may include related data, objects, and/or Webpage content. With a multi-tenant system, data for multiple tenants may be stored in the same physical database object in tenant data storage 522, however, tenant data may be arranged in the storage medium(s) of tenant data storage 522 so that data of one tenant is kept logically separate from that of other tenants. In such a scheme, one tenant may not access another tenant's data, unless such data is expressly shared.

Several elements in the system shown in FIG. 5 include conventional, well-known elements that are explained only briefly here. For example, user system 512 may include processor system 512A, memory system 512B, input system 512C, and output system 512D. A user system 512 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 512 to access, process and view information, pages and applications available from system 516 over network 514. Network 514 may be any network or combination of networks of devices that communicate with one another, such as any one or any combination of a LAN (local area network), WAN (wide area network), wireless network, or other appropriate configuration.

The users of user systems 512 may differ in their respective capacities, and the capacity of a particular user system 512 to access information may be determined at least in part by "permissions" of the particular user system 512. As discussed herein, permissions generally govern access to computing resources such as data objects, components, and other entities of a computing system, such as a memory usage analysis, a social networking system, and/or a CRM database system. "Permission sets" generally refer to groups of permissions that may be assigned to users of such a computing environment. For instance, the assignments of users and permission sets may be stored in one or more databases of System 516. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 516 may provide on-demand database service to user systems 512 using an MTS arrangement. By way of example, one tenant organization may be a company that employs a sales force where each salesperson uses system 516 to manage their sales process. Thus, a user in such an organization may maintain contact data, leads data, customer follow-up data, performance data, goals and progress data, etc., all applicable to that user's personal sales process (e.g., in tenant data storage 522). In this arrangement, a user may manage his or her sales efforts and cycles from a variety of devices, since relevant data and applications to interact with (e.g., access, view, modify, report, transmit, calculate, etc.) such data may be maintained and accessed by any user system 512 having network access.

When implemented in an MTS arrangement, system 516 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 516 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 516 may also maintain system-level data usable by multiple tenants or other data. Such system-level data may include industry reports, news, postings, and the like that are sharable between tenant organizations.

In some implementations, user systems 512 may be client systems communicating with application servers 550 to request and update system-level and tenant-level data from system 516. By way of example, user systems 512 may send one or more queries requesting data of a database maintained in tenant data storage 522 and/or system data storage 524. An application server 550 of system 516 may automatically generate one or more SQL statements (e.g., one or more SQL queries) that are designed to access the requested data. System data storage 524 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 6A:
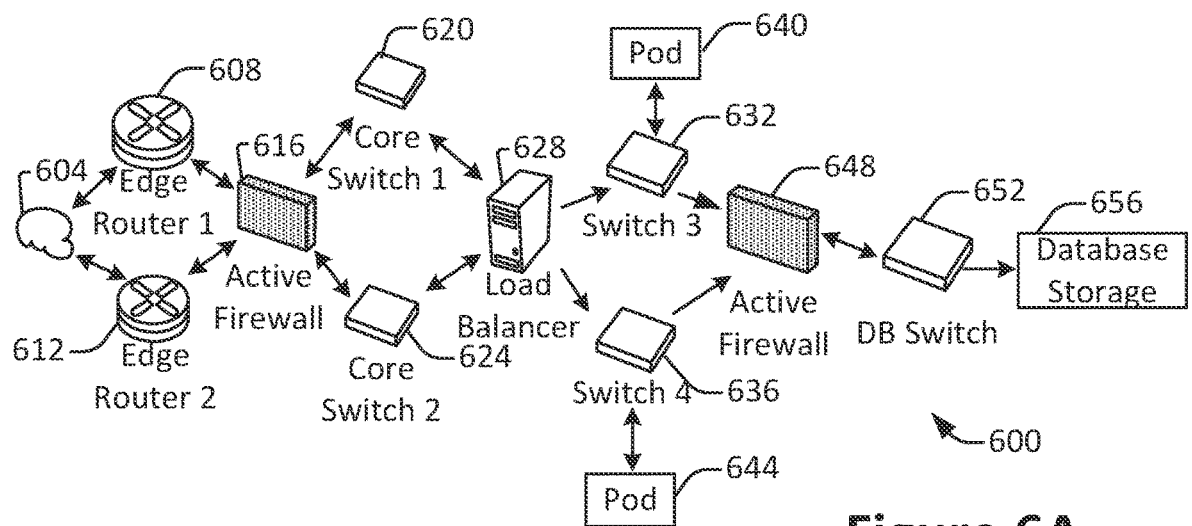
FIG. 6A shows a system diagram of an example of architectural components of an on-demand database service environment, configured in accordance with some implementations.

FIG. 6A shows a system diagram of an example of architectural components of an on-demand database service environment 600, configured in accordance with some implementations. A client machine located in the cloud 604 may communicate with the on-demand database service environment via one or more edge routers 608 and 612. A client machine may include any of the examples of user systems ?12 described above. The edge routers 608 and 612 may communicate with one or more core switches 620 and 624 via firewall 616. The core switches may communicate with a load balancer 628, which may distribute server load over different pods, such as the pods 640 and 644 by communication via pod switches 632 and 636. The pods 640 and 644, which may each include one or more servers and/or other computing resources, may perform data processing and other operations used to provide on-demand services. Components of the environment may communicate with a database storage 656 via a database firewall 648 and a database switch 652.

Accessing an on-demand database service environment may involve communications transmitted among a variety of different components. The environment 600 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 6A and 6B.

The cloud 604 refers to any suitable data network or combination of data networks, which may include the Internet. Client machines located in the cloud 604 may communicate with the on-demand database service environment 600 to access services provided by the on-demand database service environment 600. By way of example, client machines may access the on-demand database service environment 600 to retrieve, store, edit, and/or process memory usage information.

In some implementations, the edge routers 608 and 612 route packets between the cloud 604 and other components of the on-demand database service environment 600. The edge routers 608 and 612 may employ the Border Gateway Protocol (BGP). The edge routers 608 and 612 may maintain a table of IP networks or 'prefixes', which designate network reachability among autonomous systems on the internet.

In one or more implementations, the firewall 616 may protect the inner components of the environment 600 from internet traffic. The firewall 616 may block, permit, or deny access to the inner components of the on-demand database service environment 600 based upon a set of rules and/or other criteria. The firewall 616 may act as one or more of a packet filter, an application gateway, a stateful filter, a proxy server, or any other type of firewall.

In some implementations, the core switches 620 and 624 may be high-capacity switches that transfer packets within the environment 600. The core switches 620 and 624 may be configured as network bridges that quickly route data between different components within the on-demand database service environment. The use of two or more core switches 620 and 624 may provide redundancy and/or reduced latency.

In some implementations, communication between the pods 640 and 644 may be conducted via the pod switches 632 and 636. The pod switches 632 and 636 may facilitate communication between the pods 640 and 644 and client machines, for example via core switches 620 and 624. Also or alternatively, the pod switches 632 and 636 may facilitate communication between the pods 640 and 644 and the database storage 656. The load balancer 628 may distribute workload between the pods, which may assist in improving the use of resources, increasing throughput, reducing response times, and/or reducing overhead. The load balancer 628 may include multilayer switches to analyze and forward traffic.

In some implementations, access to the database storage 656 may be guarded by a database firewall 648, which may act as a computer application firewall operating at the database application layer of a protocol stack. The database firewall 648 may protect the database storage 656 from application attacks such as structure query language (SQL) injection, database rootkits, and unauthorized information disclosure. The database firewall 648 may include a host using one or more forms of reverse proxy services to proxy traffic before passing it to a gateway router and/or may inspect the contents of database traffic and block certain content or database requests. The database firewall 648 may work on the SQL application level atop the TCP/IP stack, managing applications' connection to the database or SQL management interfaces as well as intercepting and enforcing packets traveling to or from a database network or application interface.

In some implementations, the database storage 656 may be an on-demand database system shared by many different organizations. The on-demand database service may employ a single-tenant approach, a multi-tenant approach, a virtualized approach, or any other type of database approach. Communication with the database storage 656 may be conducted via the database switch 652. The database storage 656 may include various software components for handling database queries. Accordingly, the database switch 652 may direct database queries transmitted by other components of the environment (e.g., the pods 640 and 644) to the correct components within the database storage 656.

Figure 6B:
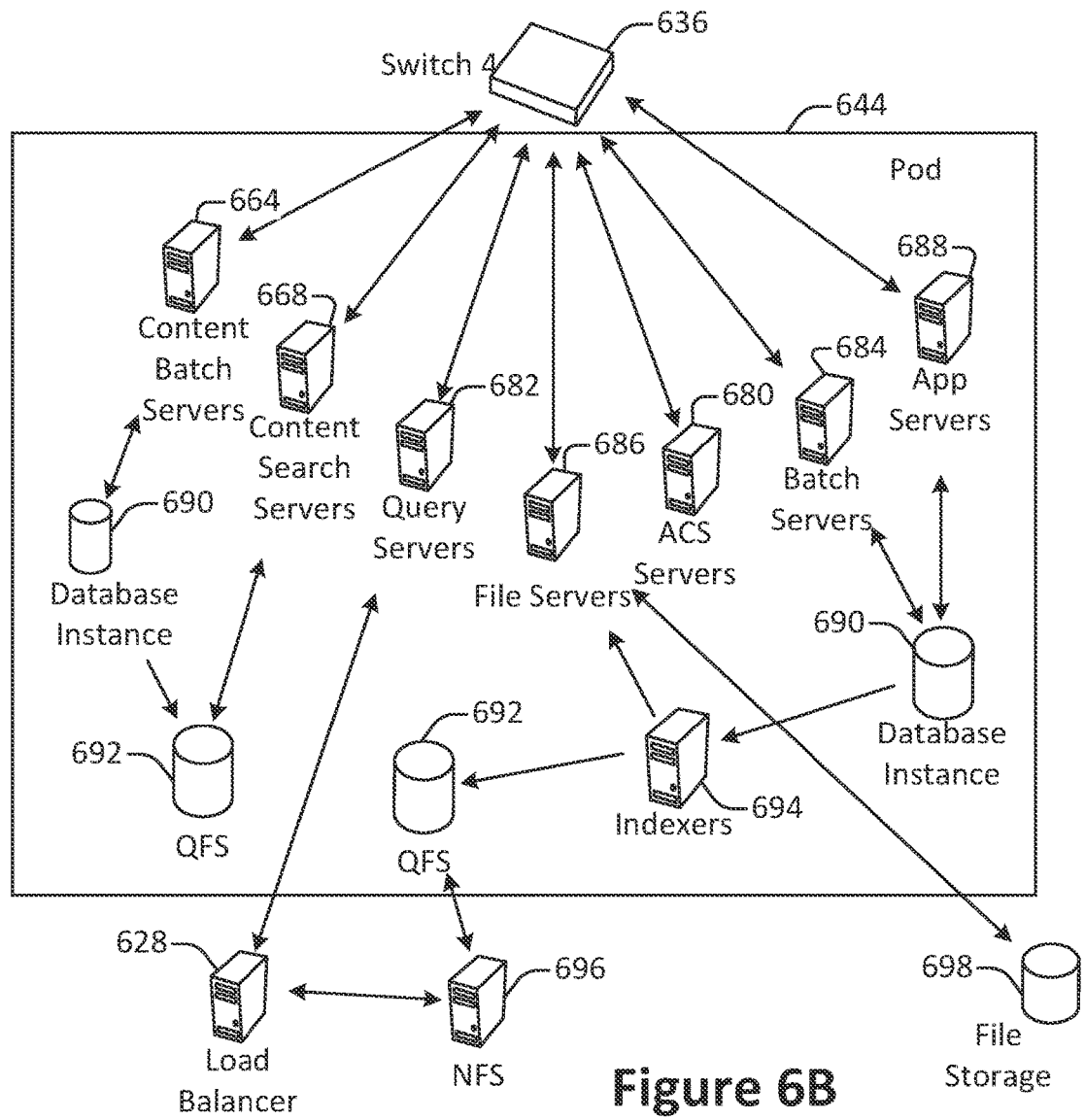
FIG. 6B shows a system diagram further illustrating an example of architectural components of an on-demand database service environment, in accordance with some implementations.

FIG. 6B shows a system diagram further illustrating an example of architectural components of an on-demand database service environment, in accordance with some implementations. The pod 644 may be used to render services to user(s) of the on-demand database service environment 600. The pod 644 may include one or more content batch servers 664, content search servers 668, query servers 682, file servers 686, access control system (ACS) servers 680, batch servers 684, and app servers 688. Also, the pod 644 may include database instances 690, quick file systems (QFS) 692, and indexers 694. Some or all communication between the servers in the pod 644 may be transmitted via the switch 636.

In some implementations, the app servers 688 may include a framework dedicated to the execution of procedures (e.g., programs, routines, scripts) for supporting the construction of applications provided by the on-demand database service environment 600 via the pod 644. One or more instances of the app server 688 may be configured to execute all or a portion of the operations of the services described herein.

In some implementations, as discussed above, the pod 644 may include one or more database instances 690. A database instance 690 may be configured as an MTS in which different organizations share access to the same database, using the techniques described above. Database information may be transmitted to the indexer 694, which may provide an index of information available in the database 690 to file servers 686. The QFS 692 or other suitable filesystem may serve as a rapid-access file system for storing and accessing information available within the pod 644. The QFS 692 may support volume management capabilities, allowing many disks to be grouped together into a file system. The QFS 692 may communicate with the database instances 690, content search servers 668 and/or indexers 694 to identify, retrieve, move, and/or update data stored in the network file systems (NFS) 696 and/or other storage systems.

In some implementations, one or more query servers 682 may communicate with the NFS 696 to retrieve and/or update information stored outside of the pod 644. The NFS 696 may allow servers located in the pod 644 to access information over a network in a manner similar to how local storage is accessed. Queries from the query servers 622 may be transmitted to the NFS 696 via the load balancer 628, which may distribute resource requests over various resources available in the on-demand database service environment 600. The NFS 696 may also communicate with the QFS 692 to update the information stored on the NFS 696 and/or to provide information to the QFS 692 for use by servers located within the pod 644.

In some implementations, the content batch servers 664 may handle requests internal to the pod 644. These requests may be long-running and/or not tied to a particular customer, such as requests related to log mining, cleanup work, and maintenance tasks. The content search servers 668 may provide query and indexer functions such as functions allowing users to search through content stored in the on-demand database service environment 600. The file servers 686 may manage requests for information stored in the file storage 698, which may store information such as documents, images, basic large objects (BLOBs), etc. The query servers 682 may be used to retrieve information from one or more file systems. For example, the query system 682 may receive requests for information from the app servers 688 and then transmit information queries to the NFS 696 located outside the pod 644. The ACS servers 680 may control access to data, hardware resources, or software resources called upon to render services provided by the pod 644. The batch servers 684 may process batch jobs, which are used to run tasks at specified times. Thus, the batch servers 684 may transmit instructions to other servers, such as the app servers 688, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 7:
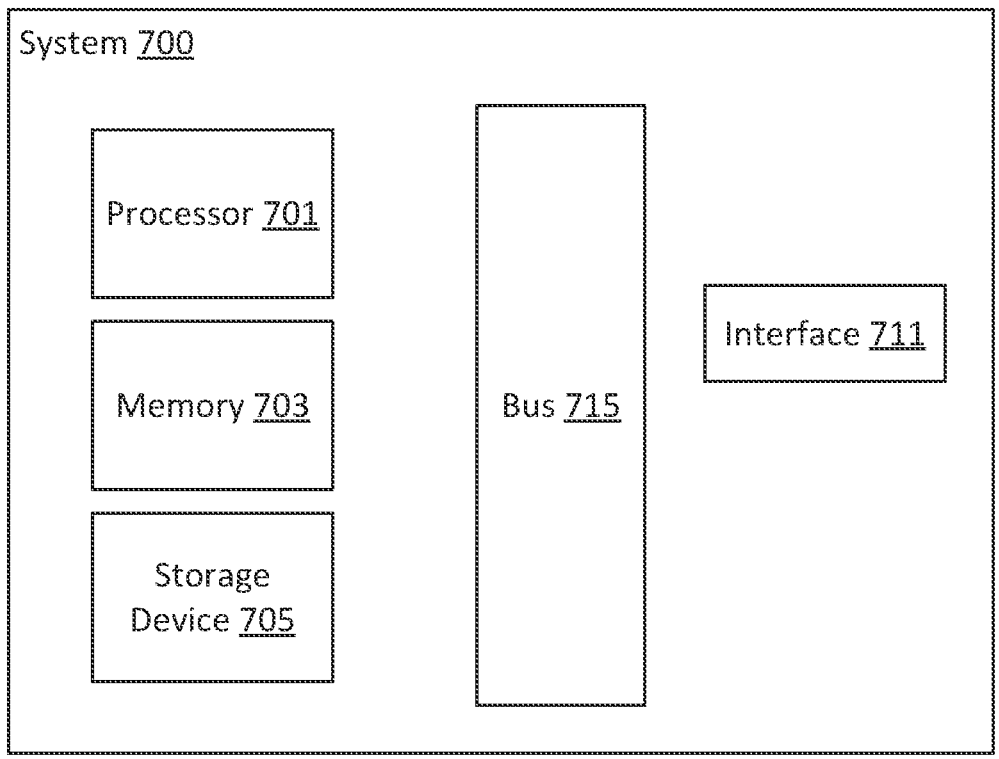
FIG. 7 illustrates one example of a computing device, configured in accordance with one or more embodiments.

FIG. 7 illustrates one example of a computing device. According to various embodiments, a system 700 suitable for implementing embodiments described herein includes a processor 701, a memory module 703, a storage device 705, an interface 711, and a bus 715 (e.g., a PCI bus or other interconnection fabric.) System 700 may operate as variety of devices such as an application server, a database server, or any other device or service described herein. Although a particular configuration is described, a variety of alternative configurations are possible. The processor 701 may perform operations such as those described herein. Instructions for performing such operations may be embodied in the memory 703, on one or more non-transitory computer readable media, or on some other storage device. Various specially configured devices can also be used in place of or in addition to the processor 701. The interface 711 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of Java. However, the techniques of disclosed herein apply to a wide variety of programming languages. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
identifying via a processor a plurality of garbage collection roots for an application based on a garbage collector implemented in a programming environment, the application being allocated memory within the programming environment, a respective garbage collection root corresponding with an object stored in the allocated memory and having a respective object class definition within a class definition hierarchy;
determining via a graph dominator a designated plurality of retained memory values corresponding with the garbage collection roots, a respective retained memory value indicating a respective amount of the allocated memory employed by a respective garbage collection root;
determining a designated plurality of application classes and associated class memory values, a respective application class including a respective one or more of the garbage collection roots associated with respective object class definitions positioned within a respective portion of the class definition hierarchy corresponding with the respective application class, a respective class memory value aggregating the designated plurality of retained memory values corresponding with the respective one or more garbage collection roots included within the associated application class; and
transmitting via a communication interface a message identifying a source of a change in memory usage for the application between application versions based on the designated plurality of application classes and associated class memory values.

2. The method recited in claim 1, wherein the designated plurality of application classes and associated class memory values and the designated plurality of retained memory values are determined at a first point in time, and wherein a comparison plurality of application classes and associated class memory values and a comparison plurality of retained memory values are determined for the application at a second point in time, the second point in time preceding the first point in time.

3. The method recited in claim 2, wherein the first point in time corresponds with a first version of the application, and wherein the second point in time corresponds with a second version of the application.

4. The method recited in claim 1, wherein the message identifying the source of the change in memory usage for the application identifies a designated portion of the class definition hierarchy.

5. The method recited in claim 1, the method further comprising:
traversing the designated portion of the object definition hierarchy to identify a designated subportion of the object definition hierarchy for which memory usage changed between the application versions, and wherein the message identifies an object definition corresponding with the designated subportion of the object definition hierarchy.

6. The method recited in claim 1, wherein the class definition hierarchy is determined based on a plurality of class names associated with class definitions.

7. The method recited in claim 1, wherein determining the designated plurality of application classes and associated class memory values involves traversing a graph dominator tree, the graph dominator tree including a plurality of object instances arranged in a plurality of hierarchical relationships determined based on graph dominance.

8. A system including a processor and a communication interface, the system configured to perform a method comprising:
identifying via the processor a plurality of garbage collection roots for an application based on a garbage collector implemented in a programming environment, the application being allocated memory within the programming environment, a respective garbage collection root corresponding with an object stored in the allocated memory and having a respective object class definition within a class definition hierarchy;

determining via a graph dominator a designated plurality of retained memory values corresponding with the garbage collection roots, a respective retained memory value indicating a respective amount of the allocated memory employed by a respective garbage collection root;

determining a designated plurality of application classes and associated class memory values, a respective application class including a respective one or more of the garbage collection roots associated with respective object class definitions positioned within a respective portion of the class definition hierarchy corresponding with the respective application class, a respective class memory value aggregating the designated plurality of retained memory values corresponding with the respective one or more garbage collection roots included within the associated application class; and transmitting via the communication interface a message identifying a source of a change in memory usage for the application between application versions based on the designated plurality of application classes and associated class memory values.

9. The system recited in claim 8, wherein the designated plurality of application classes and associated class memory values and the designated plurality of retained memory values are determined at a first point in time, and wherein a comparison plurality of application classes and associated class memory values and a comparison plurality of retained memory values are determined for the application at a second point in time, the second point in time preceding the first point in time.

10. The system recited in claim 9, wherein the first point in time corresponds with a first version of the application, and wherein the second point in time corresponds with a second version of the application.

11. The system recited in claim 8, wherein the message identifying the source of the change in memory usage for the application identifies a designated portion of the class definition hierarchy.

12. The system recited in claim 8, the method further comprising:
traversing the designated portion of the object definition hierarchy to identify a designated subportion of the object definition hierarchy for which memory usage changed between the application versions, and wherein the message identifies an object definition corresponding with the designated subportion of the object definition hierarchy.

13. The system recited in claim 8, wherein the class definition hierarchy is determined based on a plurality of class names associated with class definitions.

14. The system recited in claim 8, wherein determining the designated plurality of application classes and associated class memory values involves traversing a graph dominator tree, the graph dominator tree including a plurality of object instances arranged in a plurality of hierarchical relationships determined based on graph dominance.

15. One or more non-transitory computer readable media having instructions stored thereon for performing a method, the method comprising:

identifying via a processor a plurality of garbage collection roots for an application based on a garbage collector implemented in a programming environment, the application being allocated memory within the programming environment, a respective garbage collection root corresponding with an object stored in the allocated memory and having a respective object class definition within a class definition hierarchy;

determining via a graph dominator a designated plurality of retained memory values corresponding with the garbage collection roots, a respective retained memory value indicating a respective amount of the allocated memory employed by a respective garbage collection root;

determining a designated plurality of application classes and associated class memory values, a respective application class including a respective one or more of the garbage collection roots associated with respective object class definitions positioned within a respective portion of the class definition hierarchy corresponding with the respective application class, a respective class memory value aggregating the designated plurality of retained memory values corresponding with the respective one or more garbage collection roots included within the associated application class; and transmitting via a communication interface a message identifying a source of a change in memory usage for the application between application versions based on the designated plurality of application classes and associated class memory values.

16. The one or more computer readable media recited in claim 15, wherein the designated plurality of application classes and associated class memory values and the designated plurality of retained memory values are determined at a first point in time, and wherein a comparison plurality of application classes and associated class memory values and a comparison plurality of retained memory values are determined for the application at a second point in time, the second point in time preceding the first point in time.

17. The one or more computer readable media recited in claim 16, wherein the first point in time corresponds with a first version of the application, and wherein the second point in time corresponds with a second version of the application.

18. The one or more computer readable media recited in claim 15, wherein the message identifying the source of the change in memory usage for the application identifies a designated portion of the class definition hierarchy.

19. The one or more computer readable media recited in claim 15, the method further comprising:
traversing the designated portion of the object definition hierarchy to identify a designated subportion of the object definition hierarchy for which memory usage changed between the application versions, and wherein the message identifies an object definition corresponding with the designated subportion of the object definition hierarchy.

20. The one or more computer readable media recited in claim 15, wherein determining the designated plurality of application classes and associated class memory values involves traversing a graph dominator tree, the graph dominator tree including a plurality of object instances arranged in a plurality of hierarchical relationships determined based on graph dominance.

* * * * *